June 12, 1956     F. SMITH     2,750,253
RECOVERY OF URANIUM VALVES FROM WASTE
Filed May 28, 1945
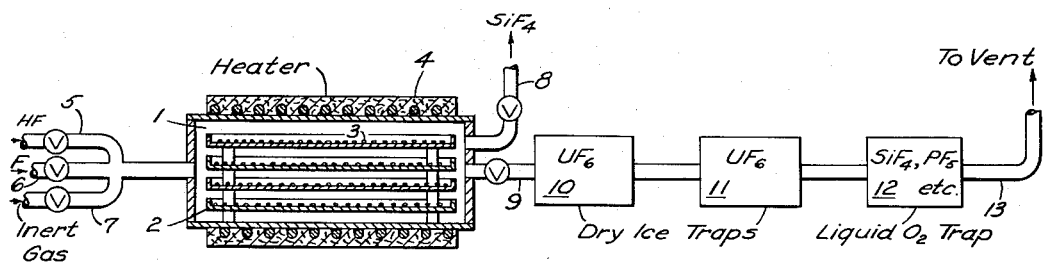
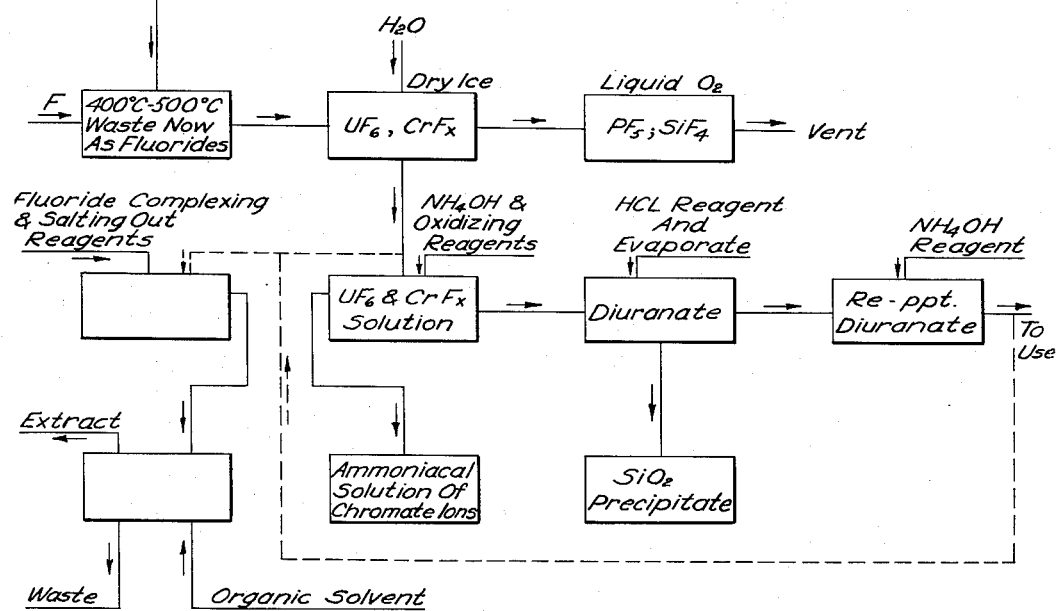
INVENTOR.
Fred Smith
BY United States Patent Office 2,750,253
Patented June 12, 1956

2,750,253

RECOVERY OF URANIUM VALUES FROM WASTE

Fred Smith, Oak Ridge, Tenn.

Application May 28, 1945, Serial No. 596,226

10 Claims. (Cl. 23—14.5)

This invention relates to the recovery of certain isotopic material from residues or waste. More particularly, this invention concerns the recovery of certain isotopes of uranium from salvage residues or wastes by means of a fluorination treatment in conjunction with further procedure for isolating a relatively high quality uranium compound therefrom.

As is known, there are operated on a sizable scale processes for the separation of isotopes exemplified by the separation of certain isotopes of uranium. Because of the value of such material, considerable care and precautions are taken, but it happens that in connection with such processes there may be certain residues which accumulate. For example, separated isotopic material stored in glass containers sometimes is subjected to breakage, and although the material is recollected, in this collection the material may be polluted by dirt that is incidentally swept into the material as well as by broken glass particles. Or in the repair and replacement of parts of equipment, there may be metal pieces such as nuts and bolts, broken insulators and numerous other apparatus parts which, because of their presence within the isotope separating equipment may have picked up a content of the uranium. Consequently, around such processes there may be accumulated residues, wastes, sweepings, and the like which are of a heterogeneous composition and of a composition that cannot be stated with any degree of certainty excepting that it is known that in such materials there is probably a valuable percentage of uranium, in many instances enriched uranium as respects isotopic composition.

It is not particularly feasible to supply such material to regular plant separation and recovery methods for uranium isotopes because such feed materials containing dirt and other pollution might severely disrupt the operation of line production and pollute the recovery systems which in many instances may be designed to operate on relatively pure or at least feeds of a known range of composition. Furthermore, because of the heterogeneous, indefinite composition of the residues, wastes, sweepings and the like referred to above, standard procedures may be insufficient or incapable of removing the valuable uranium from the dirt and undesired polluting components.

It is therefore apparent that the development of a general method which is applicable to such residues, wastes, or sweepings and which gives an efficient recovery of any valuable uranium therein represents a highly desirable result. I have discovered, as will be set forth in detail herein, a method involving fluorination in conjunction with certain other chemical treatment whereby uranium may be effectively recovered from such wastes of the class described and finally obtained in a relatively high grade form. The uranium so recovered from wastes is recovered in a quality that it may be used for various purposes. Also it is of a quality whereby it may be supplied to existing systems as feed without danger of pollution or disruption of such systems adapted to operate on a relatively high quality known feed compositions.

This invention has for one object to provide a method for the recovery of uranium.

Another, and particularly important object, is to provide a method for the recovery of uranium from residues, wastes, sweepings, and other heterogeneous, relatively indefinable compositions which may contain uranium isotopes.

Still another object is to provide a method which may be generally applied to wastes of the class described containing a uranium isotope whatever be the source or composition of said waste.

Another object is to provide a method for recovering uranium from waste in which the uranium isotope finally may be isolated in a relatively pure condition.

A still further object is to provide a general method of fluorination in cooperation with additional chemical treatment adapted to the separation of uranium isotopic material of a relatively high grade composition.

A still further object is to provide a method of uranium separation adapted to lending itself to combination with existing chemical procedures already in use for processing uranium materials.

Still another object is to provide a method for the separation of uranium material from silica, chromium and other undesired components.

A still further object is to provide a method for separating uranium material in the presence of a much larger amount of silica material.

Still another object is to provide a method of separating uranium material from chromium pollution.

Still another object is to provide apparatus arrangement for carrying out the above-identified methods.

Other objects will appear hereinafter.

It has been known in the chemical art prior to my invention that various uranium compounds, such as uranium oxide, may be reacted with fluorine to form volatile fluorination products. However, in general all of the uranium materials fluorinated by prior art processes have been relatively pure or at least of a definable composition in which the content of uranium was known within reasonable limits. As far as I am aware prior to my invention it was not known that the treating of heterogeneous wastes of the type described herein by fluorination in cooperation with the other steps described that uranium could thereby be more or less selectively removed from numerous other metallic and polluting constituents which might also be present. That is, according to the present invention it has been found that by fluorination that the uranium may be effectively separated from practically all other materials excepting silica and chromium compounds which if present may continue to some extent to pollute the uranium compound so isolated. However, in accordance with the further procedures which I have discovered, such polluting components may be effectively eliminated or reduced and a relatively pure uranium compound ultimately isolated.

Therefore, this disclosure relates to a process for recovering uranium from sweepings and residues from the various copper or other metallic parts of the isotope separating apparatus or insulators or other items. Briefly, and in general, the waste material preferably is first treated with hydrofluoric acid, presumably forming uranium tetrafluoride, and this product is then fluorinated with fluorine gas preferably at 400° C. to 500° C. to form uranium hexafluoride vapors which may be separately condensed. By this process substantially all of the uranium may be separated and recovered from the original heterogeneous material treated. It has been found that the treatment penetrates the waste, and effectively seeks out any small amount of uranium that may be in the waste.

The uranium hexafluorine produced as indicated above may contain chromium fluoride and some silica. In order to separate the chomium, the uranium hexafluoride is dissolved, and the reuslting solution is treated with excess ammonia to form a precipitate comprising ammonium diuranate and chromium hydroxide. This precipitate is separated and dissolved in a minimum amount of dilute sulfuric acid. Thereafter, the solution is boiled with oxidizing agent in order to oxidize the chromic to chromate ions. Ammonium hydroxide is then added to the oxidized solution to precipitate the uranium as the diuranate leaving the chromium in solution as chromate.

The washed ammonium diuranate precipitate may contain some silica impurity. This may be removed by dissolving the washed precipitate in hydrochloric acid and concentrating the solution nearly to dryness. The precipitated silica is filtered or centrifuged off and ammonium hydroxide is added to the solution to reprecipitate the diuranate.

The overall process which has been briefly described will now be considered in further detail in the following description. In some instances reference may be made to the mechanism of the reaction which it is believed takes place or other explanations set forth. However, it is to be understood in so doing that it is not desired to be bound by any particular theory of operation.

In developing the present invention investigations into the behavior of numerous compounds of uranium when treated with fluorine have been carried out. From the nature and origin of these residues treated by the present invention and from the treatment to which they have been subjected, it is at once apparent that the types of uranium compounds present in the residues cannot be stated with any degree of certainty. It was determined, however, that if conditions were ascertained for the successful recovery of uranium as the hexafluoride from known uranium compounds, then it might be possible for conditions of fluorination to be chosen so that the substantially complete removal of uranium from the highly complex salvage residues would be effected.

It was discovered that all the likely compounds of uranium which might be present in the wastes undergo transformation into the corresponding hexafluoride when subjected to the action of elemental fluorine. It was found, for example, that the oxides of uranium may require heating to a higher temperature (400–500° C.) than most uranium compounds in an atmosphere of fluorine before transformation into the hexafluoride takes place. On the other hand, the halides such as $UF_4$ and $UCl_4$ will give $UF_6$ when treated with fluorine at 250–300° C. Uranyl phosphate, characterized by its insolubility in acid solution was found to undergo ready conversion into $UF_6$ and phosphorus fluoride ($PF_3$ or $PF_5$) when heated in fluorine at 400° C. The fluoride of phosphorus does not condense in a Dry Ice trap while the $UF_6$ does. On the other hand, the phosphorus fluoride is retained in a trap cooled by liquid oxygen so that separation of uranium and the phosphorus may be effected. The carbide of uranium, $UC_2$, can also be converted into the corresponding hexafluoride by heating it in fluorine at approximately 350° C. during which reaction the carbon undergoes complete volatilization, probably as carbon tetrafluoride.

All these fluorination reactions were carried out in Monel or nickel vessels of suitable dimensions as were the examples to be described hereinafter. Concurrently with the aforementioned work other tests were performed which showed that mixtures of the oxides of uranium and Cu and mixtures of uranium, Cu, and Fe oxides readily yield their uranium content as the hexafluoride when treated with fluorine at 500° C.

Tests on the residues after fluorination, by analysis of radio activity, indicated that only a very small quantity, if any, of uranium remains unseparated.

The demonstrated ease of formation of the volatile $UF_6$ from compounds of uranium together with the non-volatile character of the fluoride of the metallic elements such as Fe, Cu, and Ni which may constitute a large proportion of salvage residues of the class described may explain to some extent the mechanism of the present invention whereby fluorination provides a means of recovering uranium from the salvage residues. The problem, however, is not as simple as this inasmuch as the salvage residues as already indicated appeared to consist of a mixture so complex as to be almost indescribable. Further tests showed that fluorination of salvage residues at 450° C.–500° C. removed uranium; at the same time, $SiF_4$ and a chromium fluoride are also produced.

This silicon tetrafluoride gave rise to $SiO_2$ in the chemical operations and this may be a great disadvantage in the separation of uranium and chromium. In order to surmount this difficulty it was found that the salvage residues may be first freed to a large extent if not entirely from silica by treatment with hydrogen fluoride at approximately 550° C. In addition to removing the silica it was found that this hydrofluorination simultaneously transforms the compounds present in the salvage residues into the corresponding fluorides, a change which results in greater efficiency during subsequent fluorination. This prehydrofluorination does not cause volatilization of uranium since $UF_6$ is not produced under these conditions. Then further treatment of the salvage residues, already substantially freed from silica, with fluorine at 450° C.–500° C. results in the formation of $UF_6$ and chromium fluoride. The latter presumably arises from the chromium of the stainless steel used in the construction of parts of the isotope separation apparatus.

After fluorination of the salvage residues in the manner described, a reaction which can now be carried out on various size batches, in order to obtain a relatively good U product then involves the separation of the uranium and Cr compounds which have condensed in the system of copper traps attached to the reaction vessel in which the fluorination is performed. The traps are washed out with water and the washings thus obtained contain uranium, Cr and Cu (from the trap) and fluoride. The chemical separation of the uranium from such mixtures may be accomplished by several different types of cooperating procedures so that a relatively pure uranium product may be ultimately obtained. However, there are various factors involved. If all the silica has been separated then the solution from the traps can be subjected to organic solvent extraction. Of if some silica is still present then certain chemical precipitations may be applied to separate this silica. This silica may be further treated as will be described to remove any uranium therein in a condition for return to the process.

These aspects will be further apparent from the following general description wherein it will be noted that the trap washings in addition to containing the $UF_6$ and chromium fluoride, also contained silica.

These washings from the copper traps were treated with an excess of ammonium hydroxide until no more precipitate was produced. When the pale green precipitate presumably a mixture of $(NH_4)_2U_2O_7$, $Cr(OH)_3$, hydrated $SiO_2$ had settled, the blue supernatant liquid was decanted through a filter paper (No. 44) on a Buchner funnel to remove any small amounts of precipitate which have not settled. The precipitate is then centrifuged in containers closed with rubber stoppers to prevent ingress of carbon dioxide from the air. The blue colored supernatant liquid was decanted from the centrifuge tubes through the same Buchner funnel. While still in the centrifuge tubes the crude precipitate was stirred with dilute ammonium hydroxide and centrifuged to remove any occluded copper salts. This operation may be repeated if desired in order to remove most of the copper, otherwise the progress of the next state, judged by a color change, may not be readily observed.

The precipitate in the centrifuge tubes and that on the filter paper removed from the Buchner funnel were combined, dissolved in the minimum of dilute sulphuric acid, and the solution boiled for about 1 hour with ammonium persulphate. If the solution is too strongly acid at this stage, the oxidation may proceed slowly and will not reach completion; should this be the case ammonium hydroxide may be carefully added to the solution until a precipitate begins to form.

The amount of ammonium persulphate to be added will depend upon how much chromium is present in the washings and this may of course vary from batch to batch. Usually 20 g. of ammonium persulphate are added at the beginning and thereafter further additions of 5–10 g. are made until the solution has turned yellow or reddish yellow showing that oxidation of the chromic to chromate ions has been effected.

If silica was present in any quantity in the original trap washings some usually separates at this stage of the procedure and can be removed on the centrifuge. If only a small amount of silica separates, it need not be removed until the main bulk of silica is eliminated. The yellow oxidized solution, while still hot, is treated with an excess of concentrated ammonium hydroxide and the crude ammonium diuranate centrifuged. The yellow supernatant liquid is decanted (through paper or sintered glass if necessary) and combined with all other liquids obtained from subsequent ammonium diuranate precipitations.

The crude ammonium diuranate is dissolved in concentrated hydrochloric acid, combined with any separated precipitates filtered off from the decantates and the solution evaporated in order to precipitate the silica. The latter is removed on the centrifuge and washed several times with warm water until the aqueous extract is no longer colored. The silica precipitate thus removed on the centrifuge is yellow in color, contains chromium and a little uranium and may be worked up as indicated below.

The uranium is precipitated from the hot dilute hydrochloric acid solution with an excess of ammonium hydroxide and separated on the centrifuge. The precipitate is dissolved in the minimum of dilute sulphuric acid and if the solution still contains some chromium, indicated by the solution having a brownish yellow or deep orange color, the oxidation with ammonium persulphate (5–10 g.) is repeated. Thereafter the ammonium uranate is precipitated from the hot solution with ammonium hydroxide and then subjected to two or sometimes three precipitations from nitric acid solution with ammonium hydroxide to remove sulphates. The ammonium diuranate is dissolved in dilute nitric acid; the solution is weighed, sampled for analysis and other steps carried out. The diuranate at this point is of a high quality and may be used as such for any of the usual purposes that such compound is used. Also the diuranate is of a quality that it may be combined with the feed in standard plant processes without danger of pollution.

The process of the present invention may be carried out in relatively simple apparatus. A fluorination apparatus is shown in the attached drawing forming a part of the present application. The chemical treatment may be carried out in any standard chemical equipment involving the use of filters, centrifuges and the like. Hence, special description of this portion of the apparatus herein is unnecessary.

In the attached drawing, Fig. 1 is a diagrammatic side elevation view showing the fluorination apparatus and associated parts.

Fig. 2 is a flow sheet which generally illustrates one embodiment of a process in accordance with the present invention.

Referring to Fig. 1, 1 represents a fluorination chamber which is provided with a suitable opening, not shown, whereby the trays 2 containing the waste 3 to be treated may be inserted in the chamber. The exact construction of this fluorination chamber is not vital except that it should be constructed of fluorine resistant material such as nickel, Monel metal, other nickel-copper alloys or other corrosion resistant materials. It may be in the form of a muffle furnace and the means through which the trays 2 are inserted into the equipment may be on the ends or on the side of the apparatus. Heating means are diagrammatically indicated at 4.

The chamber is provided with a plurality of valved-conduits 5, 6, and 7 the purpose of which is to permit the introduction of HF, $F_2$ and an inert gas, such as nitrogen, helium, or the like. The latter is for the purpose of flushing or purging the equipment if this is desirable, as between the steps of HF treatment and $F_2$ treatment.

The chamber 1 is also provided with one or more exit conduits 8 and 9 suitably valved, for example, so that the silicon fluoride formed in the first treatment may be exhausted and that later during the fluorination, the fluorination products may be conducted through conduit 9. Conduit 9 leads through a plurality of traps 10, 11, and 12. These traps may be of conventional construction such as a copper trap cooled by Dry Ice in the instance of traps 10 and 11. Trap 12 is similar excepting that it is cooled by more drastic cooling medium such as liquid oxygen. The exit from the last trap 12 may be vented to a stack or scrubbers (not shown).

The first-mentioned traps 10 and 11 are constructed so that they may be removed and washed with water or other solvent introduced into the traps for flushing out the fluoride product condensed therein. The effluent from the washing is drawn off to chemical treatment to be described. When traps containing condensed fluorides are taken out, other cleaned and dried traps may be inserted.

Referring now to Fig. 2, the flow sheet there shown is understandable from the legends appearing thereon and diagrammatically illustrates one succession of various steps which may be carried out, such as have been fully described above.

While the main line process has been described above, in connection with the operation of this process in order to obtain complete recovery of all of the valuable uranium compound, there may be several ancillary procedures carried out in conjunction with the main operations. For example, procedure may be applied for separating any small amount of uranium which may be present in the silica separated in the main line process. One method of treating this silica for separating any uranium contained therein is as follows: As described, in many instances all of the silica is removed in the pretreatment so that the present step may not always be required. However, if all the silica is not removed in the HF treatment, the greater proportion of the silica separates during the concentration with hydrochloric referred to above. Further small quantities may separate during the subsequent working up and these too may be combined with the main bulk of the silica. Also the silica residues from several batches may be combined and allowed to stand in acidified aqueous solution for several days during which time the solution becomes yellow, and at the same time uranium, chromium (as dichromate) and some silica pass into solution. The solution is decanted and the residual liquid separated by means of the centrifuge; the silica is washed until the washings are colorless. The decanted liquid and washings are combined, evaporated to suitable volume (200–300 cc.) and treated with an excess of ammonium hydroxide.

The precipitate is separated in the centrifuge, dissolved in concentrated hydrochloric acid, and the solution evaporated to precipitate any residual silica. The latter is removed and together with that already separated, and may be returned for hydrofluorination and subsequent fluorination. Addition of an excess of ammonium hydroxide to the solution precipitates the uranium as the ammonium salt which is separated on the centrifuge. After two precipitations from a solution in dilute nitric acid with ammonium hydroxide, the ammonium uranate is usually sufficiently pure. It may be placed in solution in dilute nitric acid and recycled to plant operations. The solution may, of course, be weighed and sampled for analysis before recycling or other use.

It happens in many instances that when the prehydrofluorination of the salvage residues is carried out in accordance with the present invention no silica is present in the trap washings. When these conditions obtain the above separation of uranium from silica will be unnecessary and furthermore, as is apparent, the chemical separation will be greatly simplified. The above description has been directed to the treatment of a troublesome waste. Some wastes do not present all of these difficulties, and the process may be correspondingly simplified.

It is highly desirable to carry out all the ammonium hydroxide precipitations, apart from the first performed on the trap washings, in hot solution and all ammonium diuranate precipitates preferably are separated in centrifuge equipment in which carbon dioxide of the air may not enter. These conditions are desirable to avoid loss of uranium due to the formation of the water soluble carbonate complex.

The method which has been described for the isolation of uranium from trap washings is a somewhat lengthy procedure. Nevertheless, it has resulted in the successful recovery of a number of grams of uranium from salvage residues. There are several other methods which may be employed.

For example, an ether extraction is a relatively simple procedure which may be applied to these washings with advantage. For instance, the fluoride present in the washings may be complexed with calcium or aluminum, and the liquid then subjected to extraction. Still another method would be to treat the trap washings with excess of ammonium hydroxide in the presence of an aluminum salt to complex the fluoride ions. The precipitate could then be dissolved in nitric acid and subjected to organic solvent extraction. The uranium is separated from the solvent layer by contact with water after which the uranium may be precipitated as the peroxide, separated and ignited to $U_3O_8$.

Various solvents such as ethyl ether, carbitol, and the like may be used.

Various amounts of NaOH, aluminum nitrate, and calcium carbonate may be added dependent on the concentration of fluoride ion and related factors.

For a still further understanding of my invention, the following detailed example is set forth as applied to a ten pound batch of wastes.

*Example*

The ten pound batch was placed in apparatus as described and treated first with hydrogen fluoride at 500°–600° C. in order to remove silica and convert the rest of the convertible material into the corresponding fluorides. The system was purged free of HF before treatment of the hydrofluorinated material with fluorine at 450°–500° C. which produced the volatile compounds. $UF_6$ and chromium fluoride. These were condensed in a series of 5 copper traps, the first two of which were cooled in a Dry Ice-trichlorethylene mixture and the rest cooled in liquid oxygen.

At the conclusion of the foregoing operation which took about 4 hours, first the two traps were washed out with water, and the solution treated with an excess of ammonium hydroxide. The precipitate thus produced, presumably comprising a mixture of $(NH_4)_2U_2O_7, Cr(OH)_3$, and hydrated $SiO_2$, was removed and treated with about 30 g. of ammonium persulphate, which oxidized the $Cr^{+++}$ to $CrO_4^{--}$ ions. Subsequent addition of ammonium hydroxide precipitated the $(NH_4)_2U_2O_7$ with silica while the chromium remains in solution as chromate. The silica was eliminated by evaporation with hydrochloric acid, and the ammonium diuranate was further purified by several persulphate oxidations to complete the removal of Cr followed by precipitation from a solution in nitric acid to remove sulphate. The ammonium diuranate obtained was dissolved in dilute nitric acid and returned to the plant for feed.

The operational details, showing quantities of solutions, amounts of reagents added and related items are tabulated below:

1. Add an excess of concentrated ammonium hydroxide to the cold washings (2 liters) from the copper traps until no further precipitation is produced (300–500 cc. usually sufficient). Allow precipitate to settle.

2. Pour off clear blue liquid above the precipitate through a No. 44 filter paper on a Buchner funnel and centrifuge off the precipitate. Stir precipitate in the centrifuge tubes with dilute ammonium hydroxide (1 vol. conc. ammonium hydroxide and 1 volume water) and centrifuge. Repeat until liquid is colorless or only pale blue.

3. Stir precipitate in centrifuge tubes with hot 4 N sulphuric acid and transfer solution to a beaker. To this same beaker add the solution of the precipitate (collected in the Buchner funnel) made by pouring hot 4 N sulphuric acid through the funnel.

4. To this acid solution add ammonium hydroxide until precipitation just commences. Adjust volume to 500–700 cc. by addition of water and boil for one hour on hot plate with ammonium persulphate (20 g.), until the solution, at first brown or blue brown, becomes yellow or red yellow. If the solution does not turn yellow or red yellow, the solution may be removed from hot plate for 10–15 minutes, and then a further 10 g. ammonium persulphate added and boil making further additions of ammonium persulphate if necessary.

5. To hot yellow solution add concentrated ammonium hydroxide (200 cc. approximately) until precipitation is complete.

6. Separate precipitate on centrifuge, dissolve it in concentrated hydrochloric acid (100–150 cc.) and evaporate almost to dryness in a beaker.

7. Dilute contents of beaker with water (100–200 cc.) and centrifuge off the silica. Repeat until washings are colorless. (Silica may be treated as described below.)

8. Combine solution and washings, heat almost to the boil and add excess of concentrated ammonium hydroxide (100–200 cc.) until precipitation is complete.

9. Centrifuge off the precipitate, dissolve it in hot 4 N sulphuric acid, add ammonium hydroxide to give a small precipitate and boil with ammonium persulphate (10 g.) for one hour.

10. Add concentrated ammonium hydroxide to the hot solution and centrifuge precipitate.

11. Dissolve precipitate in hot 5 N nitric acid and add concentrated ammonium hydroxide until precipitation is complete. Repeat until a sulphate test on the clear liquid above the precipitate is negative.

12. Dissolve precipitate in dilute nitric acid thereby obtaining a solution for return to the plant. In the above operations all the ammonium hydroxide precipitations apart from the first performed, were carried out in hot solution and all ammonium diuranate precipitates were separated in centrifuge tubes which were kept stoppered. These conditions prevented loss of uranium due to the formation of a water soluble carbonate complex.

Referring to step 7 above, the silica from several runs were combined and allowed to stand for 3–4 days in water (3 parts) to which had been added 4 N $H_2SO_4$ (10 cc. to each 100 cc. water). During this time the mixture was stirred occasionally. The silica was centrifuged off and washed three times with water. Solution and washings were combined and concentrated to a volume of 200 cc. Then excess ammonium hydroxide (100–150 cc.) was added and precipitate centrifuged off. This precipitate may then be treated according to operational steps 6 to 12 above.

The silica residues after extraction were returned to further hydrofluorination cycles of following batches.

The liquid from operation 2 above was evaporated to dryness and the solid, after ignition to volatilize the ammonium salts, returned for recycle. The liquids from all other ammonium hydroxide precipitations were combined and evaporated to dryness and when sufficient solid accumulated, it was ignited and returned for refluorination.

By the above process over 98% of all of the uranium in the ten pound batch of waste was recovered. This may be ascertained by analysis of the radioactivity of representative samples of the waste prior to treatment and after treatment before discard.

The above example illustrating the preferred embodiment describes the reagents and quantities which may be used. However, other reagents and concentrations may also be employed. For example, in place of the use of water for washing out the traps, various alkali solutions may be used such as a weak sodium hydroxide solution. In place of, or supplemental to the use of a persulfate oxidizing agent, $H_2O_2$ may be used. That is, in place of separating the U and Cr as described, similar separation may be accomplished by the use of ammonia and $H_2O_2$. Or in some instances the addition of $H_2O_2$ alone will serve to oxidize and to precipitate the U as the peroxide leaving the chromate ions in solution.

The time of fluorination has been indicated as approximately four hours for a ten pound batch. In the event that the materials are constantly shaken within the chamber, a shorter time of fluorination may suffice. Also, if the waste materials are relatively poor in uranium, a shorter time may suffice. On the other hand, with larger quantities or with waste in a more compact inaccessible form, a greater length of fluorination time may be desirable. It is apparent that certain of the conditions described in the preferred embodiment will be arrived at on the basis of data observed from previous operations.

The uranium recovered in the above example was an enriched product. That is, the composition compared with the respective quantities of the various isotopes going to make up natural uranium were not the same as in natural uranium. Certain of the isotopes were present in the uranium recovered in a greater amount than in natural uranium. However, the degree of enrichment of the uranium does not affect the present process which may be applied to recovery of all compositions varying from, for example, natural uranium to uranium which is largely of a single isotope.

It is to be understood that all matter contained in the above description and examples shall be interpreted as illustrative and not limitative of the scope of this invention, and, it is intended to claim the present invention as broadly as possible in view of the prior art.

I claim:

1. A process for the recovery of uranium values from indiscriminate waste material containing the same, which comprises hydrofluorinating the waste material with hydrogen fluoride vapor within the temperature range of about 500° to 600° C. whereupon metal values, including uranium, are converted to non-volatile fluorides, then fluorinating the hydrofluorinated residue within the range of about 400° to 500° C. with fluorine gas whereupon uranium values are converted to a volatile fluoride form and are evolved, and recovering the evolved uranium fluoride containing vapors.

2. A process for the recovery of uranium values from waste materials containing silica and metal values, including uranium, which comprises hydrofluorinating the waste material with hydrogen fluoride vapor at a temperature not greater than about 600° C., but at a temperature sufficient to cause the volatilization of silica therein as a volatile silicon fluoride compound, whereupon the silicon fluoride compound is evolved and metal values, including uranium, are converted to non-volatile fluorides, removing the evolved silicon-containing vapors, then fluorinating the hydrofluorinated residue within the temperature range of about 400° to 500° C. with fluorine gas whereupon uranium values are converted to a volatile fluoride form and are evolved, and recovering the evolved uranium fluoride-containing vapors by condensation.

3. A process for the recovery of uranium values from waste materials containing silica and metal values, including uranium and chromium, which comprises hydrofluorinating the waste material with hydrogen fluoride vapor under conditions such that silicon tetrafluoride is formed and volatilized and metal values, including uranium, are converted to non-volatile fluorides, removing the resultingly evolved silicon tetrafluoride-containing vapors, then fluorinating the hydrofluorinated residue with fluorine gas so that volatile fluorides of chromium and uranium are formed and evolved, recovering the vapors thus evolved by condensation, dissolving the formed condensate in an aqueous medium, treating the resulting solution so as to eliminate fluoride ions, and separating and recovering uranium values in uranium compound form away from the chromium present in the solution.

4. A process for the recovery of uranium values from waste materials containing silica and metal values including uranium and chromium, which comprises hydrofluorinating the waste material at a temperature within the approximate range of 500° to 600° C. with hydrogen fluoride vapor whereupon volatile silicon tetrafluoride is formed and metal values, including uranium, are converted to non-volatile fluorides, removing the resultingly evolved silicon tetrafluoride vapors, then fluorinating the hydrofluorinated residue within the temperature range of about 400° to 500° C. with anhydrous fluorine gas whereupon uranium values are converted to a volatile fluoride form and are evolved, accompanied by vapors of concomitantly-formed, volatile fluoride of chromium, recovering the vapors thus evolved by condensation, dissolving the formed condensate in an aqueous medium, treating the resulting solution so as to eliminate fluoride ions, oxidizing the chromium ions present in the solution to the chromate state, adding sufficient ammonium hydroxide to the solution to precipitate ammonium diuranate while chromium remains behind in solution, and separating and recovering the ammonium diuranate-containing precipitate.

5. A process for the recovery of uranium values from waste materials containing silica and metal values, including uranium and chromium, which comprises hydrofluorinating the waste material at a temperature within the approximate range of 500° to 600° C. with hydrogen fluoride vapor, whereupon volatile silicon tetrafluoride is formed and metal values, including uranium, are converted to non-volatile fluorides, removing the resultingly evolved silicon-tretrafluoride-containing vapors, then fluorinating the hydrofluorinated residue within the temperature range of about 400° to 500° C. with fluorine gas whereupon volatile fluorides of uranium and chromium are formed and evolved, recovering the vapors thus evolved by condensation, dissolving the formed condensate to form an aqueous solution thereof, adding ammonium hydroxide to the solution so as to form a precipitate comprising uranium and chromium compounds, separating the formed precipitate and redissolving it to form an aqueous solution, oxidizing the chromium ions in the solution to the chromate state, then adding ammonium hydroxide to the solution to form a precipitate comprising ammonium diuranate while chromium remains behind in solution, and separating and recovering the ammonium-diuranate-containing precipitate.

6. A process for the recovery of uranium values from waste materials containing silica and metal values, including uranium and chromium, which comprises hydrofluorinating the waste material at a temperature within the approximate range of 500° to 600° C. with hydrogen fluoride vapor, whereupon volatile silicon tetrafluoride is formed and metal values, including uranium, are converted to non-volatile fluorides, removing the resultingly evolved silicon-tetrafluoride-containing vapors, then fluorinating the hydrofluorinated residue within the temperature range of about 400° to 500° C. with anhydrous fluorine gas whereupon volatile fluorides of uranium and chromium are formed and evolved, recovering the fluorination-evolved vapors by condensation, dissolving the formed condensate to form an aqueous solution thereof, adding ammonium hydroxide to the solution so as to form a precipitate comprising ammonium diuranate and chromic hydroxide, separating the formed precipitate and redissolving it in aqueous sulfuric acid, oxidizing the chromic ions in the sulfuric acid solution to the chromate state by means of adding ammonium persulfate to the solution, then adding ammonium hydroxide to the solution to form a precipitate comprising ammonium diuranate while chromium remains behind in solution, and separating and recovering hte ammonium-diuranate-containing precipitate.

7. A process for the recovery of uranium values from waste materials containing silica and metal values, including uranium and chromium, which comprises hydrofluorinating the waste material at a temperature within the approximate range of 500° to 600° C. with hydrogen fluoride vapor whereupon volatile silicon tetrafluoride is formed and metal values, including uranium, are converted to non-volatile fluorides, removing the resultingly evolved silicon-tetrafluoride-containing vapors, then fluorinating the hydrofluorinated residue within the temperature range of about 400° to 500° C. with fluorine gas whereupon volatile fluorides of uranium, chromium and silicon are formed and evolved, recovering the fluorination-evolved vapors by condensation, dissolving the formed condensate to form an aqueous solution thereof, treating the formed solution so as to eliminate fluoride ions, oxidizing the chromium ions present in the solution to the chromate state, adding ammonium hydroxide to the oxidized solution to form a precipitate comprising ammonium diuranate while chromium remains behind in solution, separating the formed precipitate and dissolving it in aqueous hydrochloric acid, incompletely evaporating the formed aqueous hydrochloric acid solution to separate from the dissolved uranium values, by precipitation as silica, dissolved silicon which may have accompanied the uranium to this point in the process, and separating and recovering the supernatant, uranium-containing solution.

8. A process for the recovery of uranium values from waste materials containing silica and metal values, including uranium and chromium, which comprises hydrofluorinating the waste material at a temperature within the approximate range of 500° to 600° C. with hydrogen fluoride vapor whereupon volatile silicon tetrafluoride is formed and metal values, including uranium, are converted to non-volatile fluorides, removing the resultingly evolved silicon-tetrafluoride-containing vapors, then fluorinating the hydrofluorinated residue within the temperature range of about 400° to 500° C. with fluorine gas whereupon volatile fluorides of uranium and chromium are formed and evolved, recovering the fluorination-evolved vapors by condensation, dissolving the formed condensate to form an aqueous solution thereof, adding a reagent to the solution to form a soluble complex with the fluoride ions therein, and recovering the dissolved uranium in the solution by means of organic solvent extraction.

9. In a fluorination process for the recovery of uranium, the method of separately recovering uranium from an aqueous solution of dissolved uranium hexafluoride and chromic fluoride which comprises adding ammonium hydroxide to the solution so as to form a precipitate comprising ammonium diuranate and chromic hydroxide, separating the formed precipitate and redissolving it to form an aqueous solution, oxidizing the chromic ions to the chromate state, then adding ammonium hydroxide to the oxidized solution to form a precipitate comprising ammonium diuranate while chromium remains behind in solution, and separating and recovering the ammonium-diuranate-containing precipitate.

10. In a fluorination process for the recovery of uranium, the method of separately recovering uranium from an aqueous solution of dissolved uranium hexafluoride, chromic fluoride, and silicon tetrafluoride which comprises adding ammonium hydroxide to the solution so as to form a precipitate comprising ammonium diuranate accompanied by compounds of chromium and silicon, separating the formed precipitate and redissolving it in aqueous sulfuric acid, oxidizing the chromium ions in the sulfuric acid solution to the chromate state by means of adding ammonium persulfate to the solution and heating, then adding hot ammonium hydroxide to the solution to form a precipitate comprising ammonium diuranate while chromium remains behind in solution, separating the formed diuranate precipitate and dissolving it in aqueous hydrochloric acid, incompletely evaporating the formed aqueous hydrochloric acid solution to separate from the dissolved uranium values, by precipitation as silica, dissolved silicon which may have accompanied the uranium to this point in the process, and separating and recovering the supernatant, uranium-containing solution.

No references cited.